United States Patent
Schusser

(10) Patent No.: US 10,011,218 B2
(45) Date of Patent: Jul. 3, 2018

(54) WARNING SIGNAL CONTROL SYSTEM FOR MOTOR VEHICLES

(71) Applicant: Bayerische Motoren Werke Aktiengesellschaft, Munich (DE)

(72) Inventor: Peter Schusser, Mammendorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/429,401

(22) Filed: Feb. 10, 2017

(65) Prior Publication Data

US 2017/0151905 A1 Jun. 1, 2017

Related U.S. Application Data

(63) Continuation of application No. PCT/EP2015/068299, filed on Aug. 7, 2015.

(30) Foreign Application Priority Data

Aug. 11, 2014 (DE) ........................ 10 2014 215 900

(51) Int. Cl.
*B60Q 1/00* (2006.01)
*B60Q 1/46* (2006.01)
(Continued)

(52) U.S. Cl.
CPC ................. *B60Q 1/46* (2013.01); *B60Q 1/34* (2013.01); *B60Q 5/00* (2013.01); *B60Q 5/008* (2013.01)

(58) Field of Classification Search
CPC ... B60Q 1/46; B60Q 1/34; B60Q 5/00; B60Q 5/008
(Continued)

(56) References Cited

U.S. PATENT DOCUMENTS 9,008,907 B2 * 4/2015 Copeland ................ B60R 16/03
701/36
2006/0049029 A1 3/2006 Eggers et al.
(Continued)

FOREIGN PATENT DOCUMENTS

DE 195 40 768 A1 5/1997
DE 197 01 801 A1 7/1998
(Continued)

OTHER PUBLICATIONS

International Search Report (PCT/ISA/210) issued in PCT Application No. PCT/EP2015/068299 dated Oct. 13, 2015 with English translation (Six (6) pages).
(Continued)

*Primary Examiner* — Daryl Pope
(74) *Attorney, Agent, or Firm* — Crowell & Moring LLP

(57) ABSTRACT

A warning signal control system is equipped with an optical warning signal actuator, preferably the headlight flasher which is already available, an acoustic warning signal actuator for emitting a vehicle-external warning sound which differs from the conventional horn signal, at least one electronic control unit, and a single operating switch. The switch signal is an input signal of the control unit by which both the optical warning signal actuator as well as the acoustic warning signal actuator can be activated separately or together. In the process, the activation of the optical warning signal actuator and/or the acoustic warning signal actuator can be controlled at least depending on the vehicle speed when the operating switch is actuated. The operating switch is the operating element which is already provided for the conventional light flashing function and is used here in a multifunctional manner.

16 Claims, 1 Drawing Sheet

(51) Int. Cl.
  *B60Q 5/00* (2006.01)
  *B60Q 1/34* (2006.01)
(58) Field of Classification Search
  USPC ....... 340/463, 432, 427, 384.1, 384.5–384.7, 340/388.1, 391.1
  See application file for complete search history.

(56) References Cited

U.S. PATENT DOCUMENTS

| | | |
|---|---|---|
| 2007/0257783 A1 | 11/2007 | Matsumoto et al. |
| 2011/0093149 A1 | 4/2011 | Tanaka |
| 2011/0199199 A1 | 8/2011 | Perkins |
| 2012/0126969 A1 | 5/2012 | Wilbur et al. |
| 2013/0249680 A1* | 9/2013 | Goto ................. B60Q 5/008 340/425.5 |

FOREIGN PATENT DOCUMENTS

| | | |
|---|---|---|
| DE | 203 02 083 U1 | 8/2003 |
| DE | 10 2009 058 903 A1 | 7/2010 |
| DE | 10 2010 006 633 A1 | 4/2011 |
| DE | 10 2010 018 402 A1 | 8/2011 |
| JP | 2002-213970 A | 7/2002 |

OTHER PUBLICATIONS

German-language Written Opinion (PCT/ISA/237) issued in PCT Application No. PCT/EP2015/068299 dated Oct. 13, 2015 (Six (6) pages).

German-language Search Report issued in counterpart German Application No. 10 2014 215 900.8 dated Apr. 24, 2015 with partial English translation (Thirteen (13) pages).

* cited by examiner

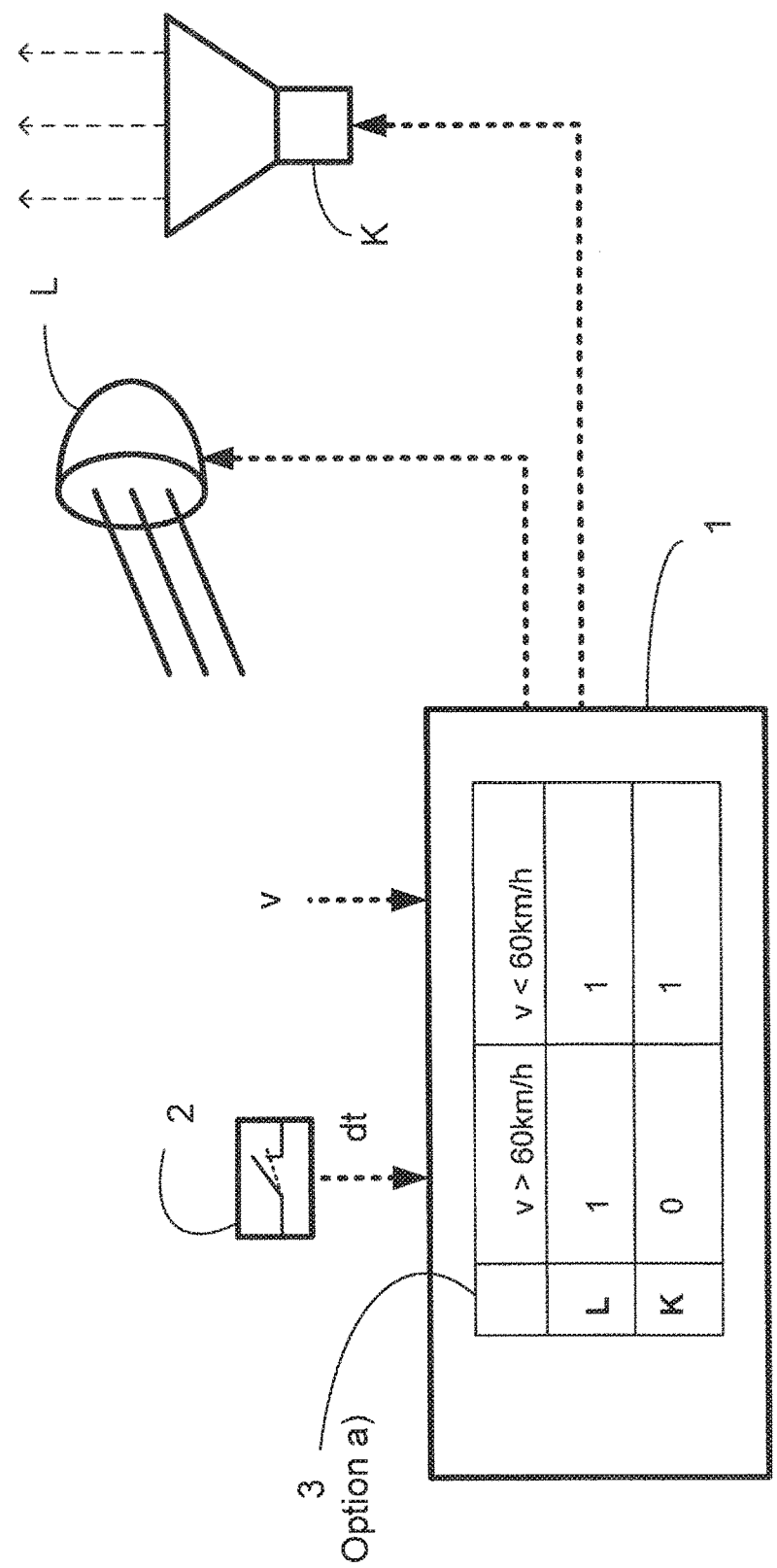

WARNING SIGNAL CONTROL SYSTEM FOR MOTOR VEHICLES

CROSS REFERENCE TO RELATED APPLICATIONS

This application is a continuation of PCT International Application No. PCT/EP2015/068299, filed Aug. 7, 2015, which claims priority under 35 U.S.C. § 119 from German Patent Application No. 10 2014 215 900.8, filed Aug. 11, 2014, the entire disclosures of which are herein expressly incorporated by reference.

BACKGROUND AND SUMMARY OF THE INVENTION

The invention relates to a warning signal control system for motor vehicles.

A warning signal control system for motor vehicles is known by way of example from German Utility Model Specification DE 203 02 083 U1. This warning signal control system combines the normal audible horn with the headlight flasher by means of a common steering wheel switch as an operator control element provided specifically for that purpose.

It is an object of the invention to configure an apparatus of the type cited at the outset to be more situation-adaptive.

This and other objects are achieved by a warning signal control system according to the invention equipped with a visual warning signal actuator, preferably what is known as the headlight flasher, which is present anyway, and with an audible warning signal actuator for outputting a vehicle-external warning sound that is different than the normal horn signal. Additionally, at least one electronic control unit and a single operator control switch are provided, the switching signal of which operator control switch is an input signal for the control unit and by which operator control switch both the visual warning signal actuator and the audible warning signal actuator are separately or collectively activable. In this case, operation of the operator control switch prompts activation of the visual warning signal actuator and/or of the audible warning signal actuator to be controllable at least on the basis of the vehicle speed.

The operator control switch is preferably the operator control element that is also provided for the normal headlight flasher function anyway, and is used by the invention in a multifunctional manner.

The following warning sounds can preferably be used:
an audible standard signal for particularly quiet road users (e.g. electric vehicles), for example prescribed by a standards setting body in the future,
a horn signal that is different than the normal horn signal at least by virtue of reduced volume,
an audible signal similar to a bicycle bell, or
an audible signal that is also used to output a warning sound when reverse gear is selected.

The invention is based on the following insights.

Road users, particularly cyclists and pedestrians, also detect vehicles by virtue of the sound of internal combustion engines. If this sound is not present (e.g. in the case of electric vehicles), a hazard can arise. An additional continuous sound generated by a sound generator would provide a remedy to the hazard to vehicle-external road users, but is unwanted for reasons of noise pollution.

Operation of the combining dual warning signal switch in the steering wheel according to the aforementioned prior art results in considerable noise pollution, particularly in city operation. In a dangerous situation, the driver is also overtaxed by the decision concerning which operator control element he is then meant to choose in order to output a warning signal. The selection would then involve three switches, namely the switch associated with the normal audible horn in the center of the steering wheel, the operator control lever switch associated with the normal headlight flasher next to the steering wheel and an additional steering wheel switch, associated with the combination of both warning signals, in accordance with German Utility Model Specification DE 203 02 083 U1.

An advantageous alternative in this regard is a warning sound activable by the driver depending on the situation. This sound is not intended to be the "horn", but rather is meant to be a quieter and more pleasant sound (e.g. similar to a bicycle bell or an audible standard signal that may be prescribed in the future for electric vehicles or other particularly quiet road users). There is also not yet a standard operator control element available for activating such a warning sound.

The operator control element must be usable intuitively and quickly. Since the hands should remain on the steering wheel in a situation that necessitates warning road users, an operator control element is needed on the steering wheel.

Optimum operator control on the basis of size and locatability can be found, on the basis of the empirical insights of the inventor, only on the steering column levers or in the region of the shift paddles.

It is already generally known practice to provide the motor vehicle driver with a visual warning signal for road users by virtue of operation of what is known as the headlight flasher (pulling the left-hand steering column lever).

The invention makes use of this circumstance. The additional warning sound is preferably switched on in addition to the activation of the headlight flasher, particularly when the steering column lever is operated, for as long as the lever is pulled.

Activation of the warning sound is performed on the basis of the vehicle speed, however, in order to prevent unnecessary noise pollution. By way of example, above a particular speed threshold (e.g. 60 km/h or the particular current maximum permissible speed in cities, for example detectable by means of road sign recognition or a navigation system), only the headlight flasher is activated when the steering column lever is operated. Below the speed threshold, either both warning signals or only the audible warning sound is/are output. The warning sound could also be output either alone or together with the headlight flasher in a particular lower speed range above standstill. In that case, at a standstill or a very low speed—that is to say when the danger potential is very low—, it would again be possible to operate only the headlight flasher in order to reduce noise.

The invention results in the advantages of intuitive and fast operator control in critical traffic situations. Furthermore, no additional operator control elements are needed.

Other objects, advantages and novel features of the present invention will become apparent from the following detailed description of one or more preferred embodiments when considered in conjunction with the accompanying drawings.

BRIEF DESCRIPTION OF THE DRAWING

The sole FIGURE illustrates an exemplary embodiment of the invention schematically showing the most important components of the apparatus with a possible application option.

DETAILED DESCRIPTION OF THE DRAWING

The single FIGURE shows a warning signal control system in a motor vehicle with a visual warning signal actuator in the form of a headlight flasher L and with an audible warning signal actuator in the form of an electro-mechanical horn or a loudspeaker K. The audible warning signal actuator K is arranged outside the vehicle interior in the manner of a horn or a reversing alarm and is used to output a warning sound that is different than the normal horn signal, at least in terms of volume.

An electronic control unit 1 receives the switching signal of an operator control switch 2, which is preferably provided for the headlight flasher function as usual, as an input signal. Additionally, the control unit 1 receives the vehicle speed v as an input signal, said vehicle speed normally being available in motor vehicles anyway as a parameter that other controllers also use frequently.

The headlight flasher L and the audible warning signal actuator K are separately or collectively activable differently at least on the basis of the vehicle speed v by use of a function table 3 in the control unit 1. By way of example, one or more options selectable via a menu may be available for the period dt of an instance of operation of the operator control switch 2:

a) Option a) (see FIGURE)

For a vehicle speed v below a prescribed threshold (e.g. 60 km/h), both the headlight flasher L and the warning sound K are activated.

For a vehicle speed v above a prescribed threshold (e.g. 60 km/h), only the headlight flasher L is activated.

b) Option b) (not Depicted in the FIGURE)

For a vehicle speed v below a prescribed threshold (e.g. 60 km/h), only the warning sound K is activated.

For a vehicle speed v above a prescribed threshold (e.g. 60 km/h), only the headlight flasher L is activated.

c) Option c) (not Depicted in the FIGURE)

For a vehicle speed v in a prescribed lower speed range (e.g. 5<v<30 km/h), only the warning sound K is activated.

For a vehicle speed v above and below this range, only the headlight flasher L is activated.

Further combinations are also possible on the basis of further parameters, such as the current location (city or country road, ascertainable from GPS or navigation data) or the level of brightness (ascertainable from a light sensor) or the presence of pedestrians/cyclists (from image recognition by means of camera), for example.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A warning signal control system for a motor vehicle, comprising:

a visual warning signal actuator;

an audible warning signal actuator for outputting a vehicle-external warning sound that is different than a normal horn signal;

at least one electronic control unit; and a single operator control switch, a switching signal of which is an input signal for the electronic control unit and by which both the visual warning signal actuator and the audible warning signal actuator are separately or collectively activable, wherein operation of the operator control switch prompts activation of the visual warning signal actuator and/or of the audible warning signal actuator to be controllable at least based on a vehicle speed.

2. The warning signal control system according to claim 1, wherein the operator control switch is the operator control element provided for a normal headlight flasher function.

3. The warning signal control system according to claim 1, wherein the warning sound is a prescribed audible standard signal for particularly quiet road users.

4. The warning signal control system according to claim 1, wherein the warning sound is different than the normal horn signal at least by virtue of reduced volume.

5. The warning signal control system according to claim 1, wherein the warning sound is similar to a bicycle bell.

6. The warning signal control system according to claim 1, wherein the warning sound is output by the audible warning signal actuator that is also used to output a warning sound when reverse gear is selected.

7. The warning signal control system according to claim 2, wherein the warning sound is a prescribed audible standard signal for particularly quiet road users.

8. The warning signal control system according to claim 7, wherein the warning sound is different than the normal horn signal at least by virtue of reduced volume.

9. The warning signal control system according to claim 8, wherein the warning sound is similar to a bicycle bell.

10. The warning signal control system according to claim 9, wherein the warning sound is output by the audible warning signal actuator that is also used to output a warning sound when reverse gear is selected.

11. The warning signal control system according to claim 1, wherein both the visual warning signal actuator and the audible warning signal actuator are activated when the vehicle speed is below a prescribed threshold.

12. The warning signal control system according to claim 1, wherein only the visual warning signal actuator is activated when the vehicle speed is above a prescribed threshold.

13. The warning signal control system according to claim 1, wherein only the audible warning signal actuator is actuated when the vehicle speed is in a prescribed speed range, and only the visual warning signal actuator is activated when the vehicle speed is outside of the prescribed speed range.

14. The warning signal control system according to claim 2, wherein both the visual warning signal actuator and the audible warning signal actuator are activated when the vehicle speed is below a prescribed threshold.

15. The warning signal control system according to claim 2, wherein only the visual warning signal actuator is activated when the vehicle speed is above a prescribed threshold.

16. The warning signal control system according to claim 2, wherein only the audible warning signal actuator is actuated when the vehicle speed is in a prescribed speed range, and only the visual warning signal actuator is activated when the vehicle speed is outside of the prescribed speed range.

\* \* \* \* \*